United States Patent [19]

Guittard et al.

[11] Patent Number: 4,650,683

[45] Date of Patent: Mar. 17, 1987

[54] COMPOSITIONS FOR COATING MILK-BASED FOOD PRODUCTS

[75] Inventors: Christine Guittard, Nogent S/Marne; Catherine Salou, Palaiseau, both of France

[73] Assignee: Compagnie Gervais Danone, Levallois Perret, France

[21] Appl. No.: 654,884

[22] Filed: Sep. 27, 1984

[30] Foreign Application Priority Data

Sep. 27, 1983 [FR] France ................ 83 15309

[51] Int. Cl.$^4$ ................ A23L 1/42
[52] U.S. Cl. ................ 426/103; 426/580; 426/575
[58] Field of Search ........ 426/89, 103, 654, 580, 426/585, 96, 100, 101, 573, 575

[56] References Cited

U.S. PATENT DOCUMENTS

| | | | |
|---|---|---|---|
| 2,864,706 | 12/1958 | Stoloff | 426/575 |
| 3,342,612 | 9/1967 | Foster et al. | 426/575 |
| 3,445,243 | 5/1969 | Moirano | 426/575 |
| 3,658,556 | 4/1972 | Klein | 426/575 |
| 4,242,367 | 12/1980 | Igoe | 426/575 |
| 4,276,320 | 6/1981 | Moirano | 426/575 |
| 4,307,124 | 12/1981 | Moirano | 426/573 |
| 4,439,186 | 2/1984 | Desia et al. | 426/580 |
| 4,479,973 | 10/1984 | Holley | 426/575 |

*Primary Examiner*—Raymond N. Jones
*Assistant Examiner*—Carolyn Paden
*Attorney, Agent, or Firm*—Oblon, Fisher, Spivak, McClelland & Maier

[57] ABSTRACT

The present invention relates to a thickening composition for a coating or topping intended for food products, said composition comprising a mixture of carrageenans and xanthan gum. The invention also relates to a coating composition comprising a thickening composition in combination with a coating base comprising fruit pulps, chocolate, coffee or mocha, in the form of pieces, powder, paste, suspension or solution, the thickening composition being present in the coating composition in a proportion of 0.4 to 1.5% by weight.

23 Claims, 2 Drawing Figures

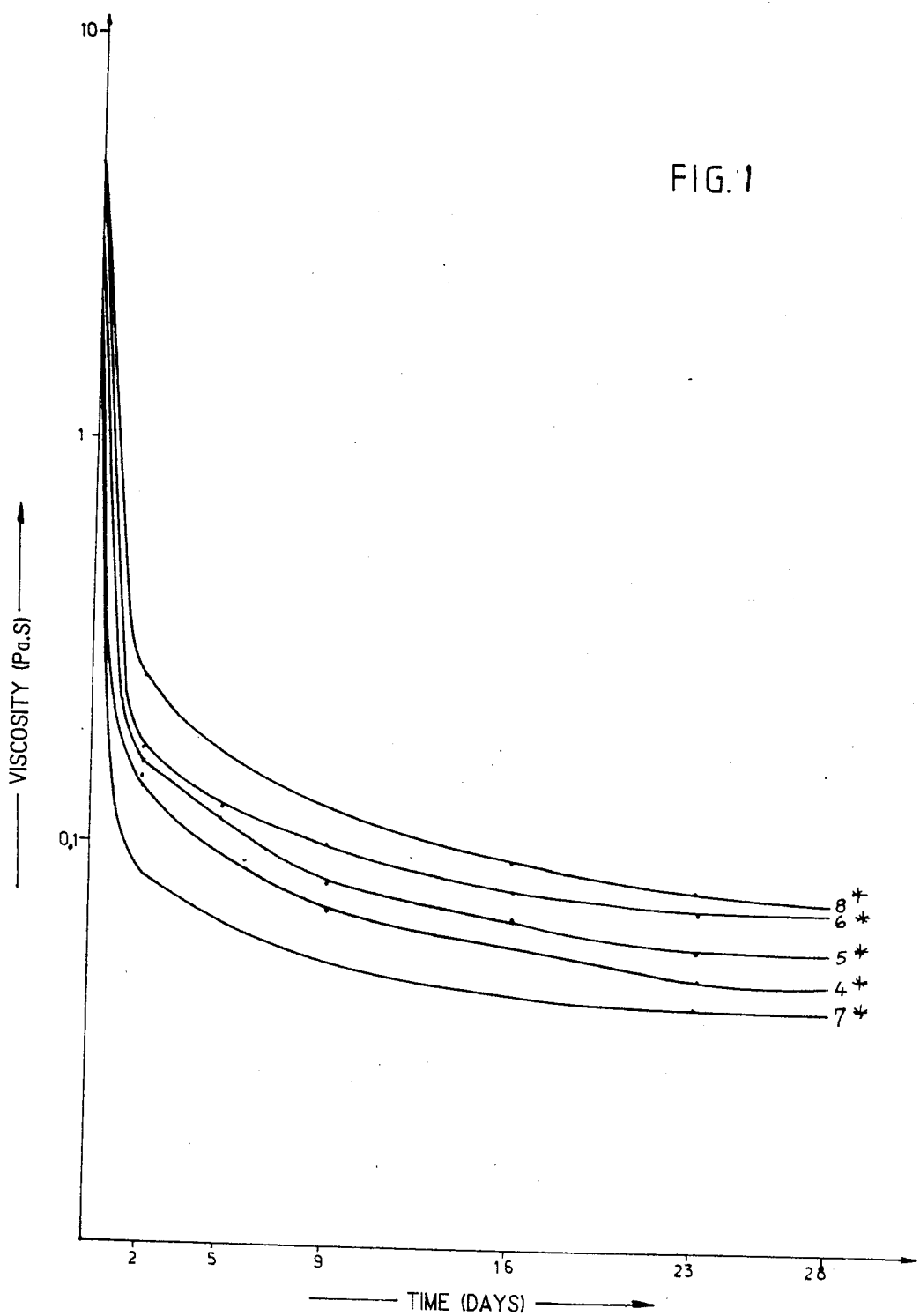

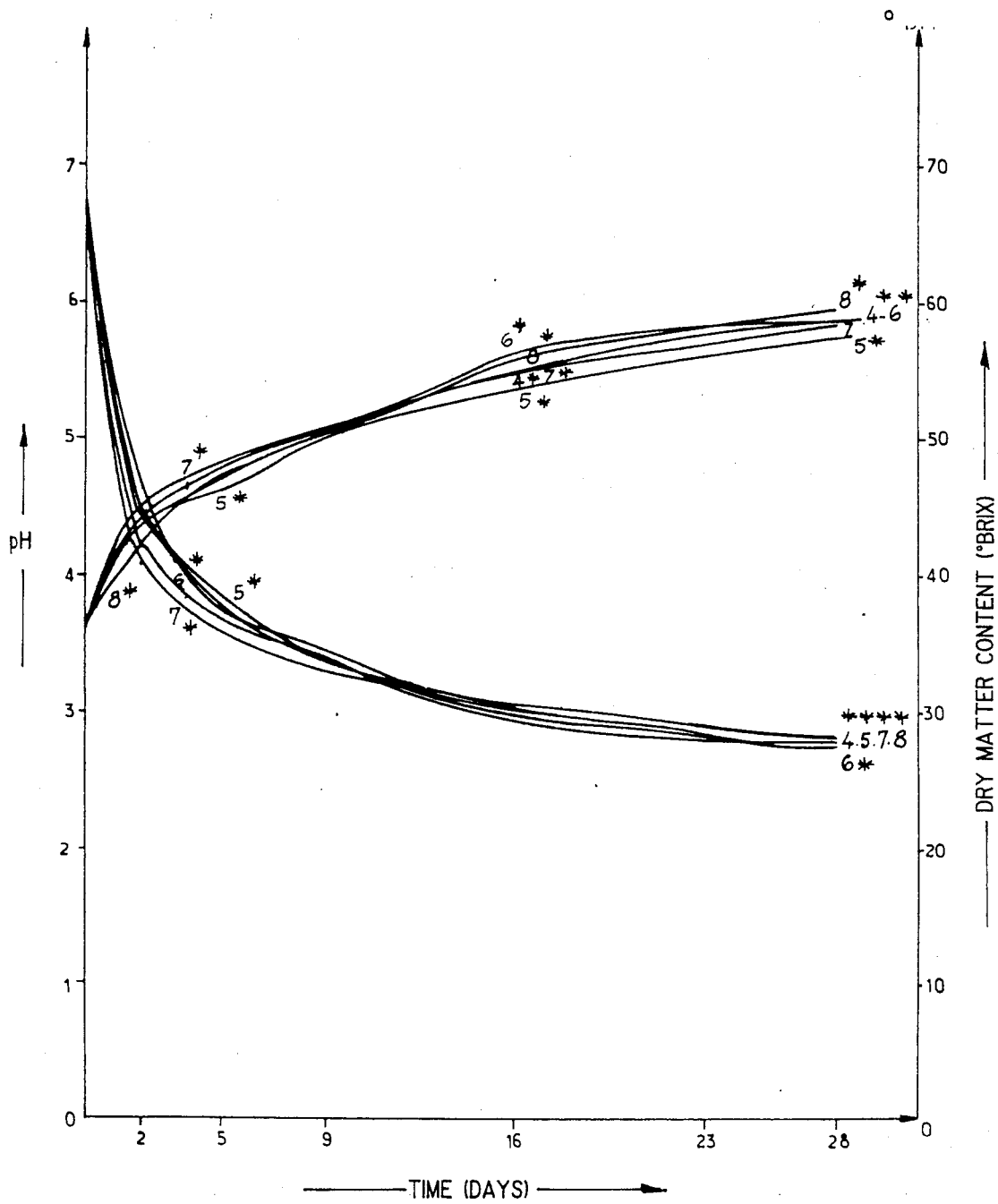

COMPOSITIONS FOR COATING MILK-BASED FOOD PRODUCTS

BACKGROUND OF THE INVENTION

1. Field of the Invention

The present invention relates to new compositions for coating desserts and more particularly to new coating or topping compositions having, despite prolonged contact with a gelled product having a different dry matter content, a coating texture homogeneous in time without appearance of synaeresis.

2. Description of the Prior Art

Numerous products whose purpose is to modify the rheological behavior of the aqueous medium in which they are introduced have been proposed in the prior art. Among known texture modifiers hydrocolloids extracted from natural products, such as guar flour, carob-bean flour, alginates, carrageenan and xanthan gum are widely used: they are designated in the laws in force in France under the name "thickening and gelling agents".

The literature mentions the use of gelling products in the preparation of different food products. Thus, French Pat. No. 2 296 376 describes the use of a gelling agent of vegetable origin for preparing custards, this gelling agent being formed preferably by a mixture of Kappa, Lambda and Iota carrageenan and carob-bean flour, or by Furcellaria or agar extracts or else a mixture of carob-bean flour and xanthan gum or a similar microbial polysaccharide. This gelling agent is introduced in a proportion of the order of 0.1 to 1% of the total weight of the custard preparation, before heat treatment, with a preferred example in which the gelling agent is present in a proportion of 0.4% formed by 0.015% of Kappa carrageenan, 0.255% of Iota carrageenan, 0.1% of Lambda carrageenan and 0.03% of carob-bean flour. U.S. Pat. Nos. 3,996,389 and 4,242,367 describe stabilizing gums for ice cream, iced milk desserts and water ices; the second of these patents recommends a stabilizing composition comprising 53–68% of guar flour, 20–35% of xanthan gum, 9–13% of carrageenan and 0 to 5% of carob-bean flour; this stabilizing agent is present in the product to be stabilized in a proportion of 0.14 to 0.25% by weight, which ensures stabilization of the product for ten days which is considered as sufficient for commercializing the product. Iota and Kappa carrageenan are preferred because of their gelling properties. French certificate of addition 2357 188 recommends the use of gelling compositions for aqueous or milk food products and more especially for yoghurt, which comprise a mixture of at least one gelling agent formed by a polysaccharide such as agar, pectin, furcellarane, carrageenan or xanthan and a second gelling agent formed by a galactomannan which has a viscosity in a 1% solution of 10 to 1000 centipoises at 25° C, which is chosen from the group comprising carob-bean, tara and Espina corona extracts. The gelling agent is added to the product to be gelled in a proportion of 0.4% and the main ingredient of the gelling mixture is carbo-bean flour, which is present in a proportion of 55 to 75% whereas the carrageenan may possibly be present in a low proportion of the order of 5% and it is not mentioned that they may be present in the mixture in association with xanthan.

The above analysis of the prior art shows that the prior art sought essentially to prepare stable food products with a gel texture, which do not present synaeresis at least for a predetermined lapse of time; now, if gelling is necessary for preparing a custard for example, such gelling is not required for the product coating these custards which must be not gelled but thickened and which must, after prolonged contact with a gelled product having a different dry matter content, not present synaeresis and must conserve a coating texture homogeneous at least until the latest date at which the food product may be consumed.

In fact, traditional coatings, with high dry matter content, have the great disadvantage that their viscosity, once in contact with the product to be coated, decreases rapidly during time to the point of becoming, after a few days, as fluid as water. The technique proposed in French Pat. No. 2, 379 258 aims at overcoming this drawback; however, it only relates to coatings with a low dry matter content (less than 40%).

SUMMARY OF THE INVENTION

The purpose of the present invention is to obtain a coating formed by a viscous solution and not by a gel and which does not present the drawbacks of the prior technique.

The inventors have discovered that the incorporation of one of the known commercial thickening agents in a coating does not allow a coating product to be obtained complying with all the following characteristics:

1. The coating product must have texture properties such that it may form a distinct phase of the product to be coated.
2. The coating product must be able to absorb, in a homogenous way, the water exuded following an osmotic pressure difference between the coating and the product to be coated.
3. It must however keep appropriate coating properties, at least from the date it is put on sale to the latest date for consumption.
4. The coating product must, even in the case where it has a high dry matter content, be significantly fluid for handling on an industrial scale not only in so far as its preparation but also its packing is concerned.
5. The coating product must allow the gelled product to be easily removed from the container by the consumer.
6. The coating product must have good palatability (not stringy and not artificial).

The aim of the present invention is to provide a thickening composition for products for coating food products such more especially as milk desserts, which complies with the conditions set forth above, in that it allows a coating product to be obtained which has excellent palatability and texture qualities, which is capable of absorbing the water exuded by the coated product without undergoing synaeressis, which is capable of keeping it homogeneity and a good coating appearance during the whole of the time of consumption, despite its high dry matter content.

The present invention provides a thickening composition for products coating food products such more especially as milk desserts, which thickening composition is characterized in that it is formed by a mixture of carrageenans and xanthan gum which are present in a weight ratio between 0.3 and 3 and preferably between 0.4 and 1.5.

BRIEF DESCRIPTION OF THE DRAWINGS

A more complete appreciation of the invention and many of the attendant advantages thereof will be readily obtained as the same becomes better understood by reference to the following description when considered with the accompanying figures; wherein:

FIG. 1, shows the viscosity curves of the coating product compositions as a function of time, during their time in the contact with the custard.

FIG. 2, shows a part of the pH curves and the curves of solution of the dry matter contact as a function of time.

DETAILED DESCRIPTION OF THE PREFERRED EMBODIMENTS

In another advantageous embodiment of the thickening composition of the invention, the carrageenans present in the composition are formed by a mixture of carrageenans of Lambda, Iota and Kappa types.

According to an advantageous arrangement of this embodiment, the Lambda, Iota and Kappa carrageenans are present in a weight ratio of the order of 1-2 Lambda/1-2 Iota/0.5-1 Kappa.

In another advantageous embodiment of the thickening composition of the invention, the carrageeenans present in the composition are Lambda type carrageenans.

According to yet another advantageous embodiment of the thickening composition of the invention, the carrageenans present in the composition are Iota type carrageenans.

According to another advantageous embodiment of the thickening composition of the invention, the carrageenans present in the composition are a mixture of Lambda and Iota type carrageenans.

According to an advantageous arrangement of this embodiment, the Lambda type carrageenans and the Iota type carrageenans are present in a weight ratio of the order of ½ to 2/1.

According to another advantageous embodiment of the thickening composition of the invention, the carageenans present in the composition are Kappa type carrageenans.

According to yet another advantageous embodiment of the thickening composition of the invention, the carrageenans present in the composition are a mixture of Iota and Kappa type carrageenans.

According to an advantageous arrangement of this embodiment, the carrageenans of the Iota and Kappa types are present in a weight ratio between 1-3 Iota/0.5/1 Kappa.

In another advantageous embodiment of the thickening composition of the invention, the carrageenans present in the composition are a mixture of Lambda and Kappa carrageenans.

According to an advantageous arrangement of this embodiment, the Lambda and Kappa type carrageenans are present in a weight ratio between 1-4 Lambda/0.5-1 Kappa.

The present invention also provides a composition for coating food products, and more especially for desserts such as flavored and gelled milk based products, custards, creams and similar, which coating composition has a dry matter content greater than 40% and comprises a thickening composition associated with a coating base such as fruit pulp or chocolate, this coating composition being characterized in that it comprises a thickening composition such as defined above, in association with a coating base chosen preferably from the group comprising fruit pulps, chocolate and/or coffee or mocha in the form of pieces, powder, paste, suspension or solution, as well as sugars and/or caramel and/or honey and possibly flavoring agents, acidulating agents, dyes and other appropriate food additives, and in that the thickening composition is present in the coating composition in a proportion of 0.4 to 1.5% and better still in a proportion of 0.4 to 1.2% and preferably in a proportion of 0.4 to 0.9% by weight of the coating composition, the xanthan present in said thickening composition representing 0.2 to 1% of the weight of the composition of the coating product.

In another advantageous arrangement of this embodiment, the proportion of carraghenanes present in the thickening composition with respect to the weight of the coating composition;

is preferably between 0.1 and 0.9% if the carrageenans used are Lambda carraghenanes or a mixture of Lambda, Iota and Kappa carrageenans in which the Lambda fraction is predominant and in which the Kappa fraction is less than or equal to 0.2%;

is preferably between 0.05 and 0.6% if the carrageenans used are Iota carraghenanes;

is preferably between 0.1 and 0.6% in the case of a Lambda, Iota and Kappa carrageenans mixture in which the Iota fraction is predominant and the Kappa fraction is less than or equal to 0.2%;

is preferably between 0.05 and 0.3% in the case where the carrageenans used are Kappa carrageenans;

is preferably between 0.1 and 0.45% in the case of a mixture of Lambda, Iota and Kappa carrageenans in which the Kappa fraction is predominant.

According to an advantageous embodiment of the coating composition in accordance with the invention, the coating base, expressed as dry matter, is present in the coating composition in a proportion between 0 and approximately 17% of the weight of said composition, the sugars and/or the caramel and/or the honey, expressed as dry matter, are present in a proportion between about 35 and 69% of the weight of the coating composition, this latter further containing water in a proportion between approximately 30 and 64% by weight.

In another advantageous embodiment of the coating composition of the invention, the dry matter content of the coating composition is between 40 and 70% with respect to the weight of the coating composition.

According to an advantageous arrangement of the invention, the viscosity of the coating composition evolves in time such that the water exuded by the food product coated with said composition is absorbed by the coating composition without causing synaeresis thereof and without adversely affecting its homogeneity and its good coating appearance for a lapse of time reaching four weeks and more.

According to an advantageous disposition of the invention, the evolution of the viscosity of the coating composition as a function of time comprises two main phases. Namely a first phase extending substantially between the day of its manufacture and its application as a coating on a food product, or day=0, and day day=4 which is generally the day of commercialization thereof, during which phase the initial viscosity decreases rapidly and considerably, all the more so the higher the dry matter content of the coating composition on day=0, and a second phase extending between day day=4 and at least day=28, during which the lowering of the viscosity is much slower.

In an advantageous mode of this disposition of the invention, the lowering of the viscosity may reach 4.6

PA.S (PA.S=Pascal·second) during the first phase and the lowering of viscosity of the second phase is at most equal to 0.25 PA.S and better still less than 0.15 PA.S and preferably less than 0.10 PA.S.

The present invention also provides a food product, more especially a custard, a cream or a similar milk based flavored and gelled product, coated with a coating composition in accordance with the preceding arrangements, in which said food product is present in a proportion of 80 to 95% and the coating in a proportion of 5 to 20% by weight.

Besides the preceding arrangements, the invention comprises other arrangements which will be clear from the following description.

The present invention relates to thickening compositions and coating products in accordance with the preceding arrangements, as well as food products, more especially gelled products, provided with a coating in accordance with the invention.

The invention will be better understood from the complement of description which follows which refers to examples for preparing the coating product in accordance with the present invention.

It should however be understood that these examples are given solely by way of illustration of the subject of the invention, of which they form in no wise a limitation.

EXAMPLES

Example 1

Fruit pulp based coating product (strawberry, raspberry or apricot)

A coating product was prepared having the following qualitative and quantitative composition:

| | |
|---|---|
| Fruit pulp (dry matter content) D.M.S* 12% | 15.0% |
| Sugars (saccharose, glucose) D.M.C.** 88% | 65.0% |
| Thickening composition: | |
| xanthan | 0.4% |
| Iota type | 0.20 |
| carrageenans | 0.2% |
| Added water | 16.0% |
| Flavors and dyes | 3.4% |

*D.M.S. = dry matter solids;
**D.M.C = dry matter contents by mixing in order the pulp, the glucose syrup and the water, then adding, with stirring, the sugar/thickening composition mixture or mix. The mixture was heated at 95° C. for a time not exceeding 15 minutes, then cooled to 70° C. for use.

The dry matter content of the coating composition prepared in this way was high, of the order of 59.6% on D day.

It was then used for coating "DANY" custards at a rate of about 10 grams of coating composition for about 90 grams of custard.

On day day=28, the coating composition was homogenous, smooth and shining; it had undergone no synaeresis; the coated custard could be removed from the mold without leaving any appreciable trace of coating in the pot which contained said custard.

The composition of the coating product when it had reached the balanced state corresponded to the following formula (dry matter content: 30%):

| | |
|---|---|
| Fruit pulp (DMC 12%) | 7.5% |
| Sugars (saccharose, glucose syrup) DMC 88% | 32.7% |
| Thickening composition: | |
| xanthan | 0.2% |
| carrageenans | 0.1% |
| Water | 57.8% |
| Flavors and coloring matters | 1.7% |

The water was absorbed without adversely affecting the homogeneity of the coating product.

Example 2

Chocolate based coating product

A coating product was prepared having the following quantative and qualitative composition by proceeding as follows:

| | |
|---|---|
| Unsweetened cocoa (20% fats) | 12.4% |
| Sugars (saccharose, glucose syrup) DMC 92% | 53.0% |
| Thickening composition: | |
| xanthan | 0.4% |
| Lambda type carrageenans | 0.2% |
| Added water | 34.0% | with an initial dry matter content of 61.7%.

By mixing in order the cocoa, the water and the composite mix of sugars and thickening composition.

The mixture was heated for a very short time less than or equal to 1 minute, at a temperature which did not exceed 135° C., then it was cooled to 70° C. for use, i.e. for coating a "DANY" custard at the rate of 8 grams of coating composition for 92 grams of custard.

On day day=28, the coating product had undergone no synaeresis; it was homogeneous, smooth and shiny and the coated custard could be removed from its container without leaving any appreciable trace of coating in the container.

The composition of the coating product, which was then in the balanced state, corresponded to the following formula (dry matter content: 30%):

| | |
|---|---|
| Cocoa | 6.0% |
| Sugars (DMC 92%) | 25.8% |
| Thickening composition: | |
| xanthan | 0.2% |
| carrageenans | 0.1% |
| Water | 67.9% |

Example 3

Caramel based coating product;

A coating product was prepared having the following qualitative and quantitative composition:

| | |
|---|---|
| Caramel (DMC 77%) | 80.0% |
| Sugar (saccharose) | 4.0% |
| Added water | 15.4% |
| Thickening composition: | |
| xanthan | 0.4% |
| Iota type carrageenans | 0.2% | with an initial dry matter content of 66.2% by mixing the caramel, the water and the mix formed by the sugar and the thickening composition, then heating the mixture for about 1 minute at a temperature which did not exceed 135° C. and cooling to 60° C. for use.

The composition of the coating product, having reached the balanced state, corresponded to the following formula on day=28:

| Caramel (DMC 77%) | 36.2% |
|---|---|
| Sugar | 1.8% |
| Water | 61.3% |
| Thickening composition: | |
| xanthan | 0.18% |
| carrageenans | 0.09% | with a dry matter content of 30%.

A "DANY" custard was coated at the rate of 7 grams of coating composition for 93 grams of custard.

The behavior of the coating product was substantially the same as in the preceeding example.

Example 4

Apricot pulp based coating product

As described in example 1 a coating product was prepared having the following composition:

| Apricot pulp (DMC 18%) | 27.0% |
|---|---|
| Sugars: saccharose, glucose syrup DMC 88% | 68.0% |
| Thickening composition: | |
| xanthan | 0.4% |
| Lambda type carrageenans | 0.2% |
| Flavors | 4.0% |
| Coloring matters | 0.4% |

This coating composition had excellent coating properties with a satisfactory evolution in time which will be stated further on.

Example 5

Apricot pulp based coating product

A coating product composition was prepared as in example 4, except that the thickening composition had the following formula:

| Xanthan | 0.4% |
|---|---|
| Iota type carrageenans | 0.2% |

This coating product composition had excellent coating properties with an evolution in time which will be stated further on.

Example 6

Apricot pulp based coating product

A coating product composition was prepared as for example 4 except that the thickening composition had the following formula:

| Xanthan | 0.4% |
|---|---|
| Kappa type carrageenans | 0.2% |

The evolution of this coating product composition in time is mentioned further on.

Example 7

Apricot pulp based coating product

A coating product composition was prepared as for example 4 except that the thickening composition had the following formula:

| Xanthan | 0.3% |
|---|---|
| Lambda type carrageenans | 0.1% |

The evolution of this coating product composition in time is given further on.

Example 8

Apricot pulp based coating product

As in example 4 a coating product composition was prepared which differs from that of example 4 in that the thickening composition had the following formula:

| Xanthan | 0.6% |
|---|---|
| Iota type carrageenans | 0.2% |
| Kappa type carrageenans | 0.2% |

The evolution of this coating product composition in time is given further on.

The coating product compositions as described in examples 4 to 8 were used for coating a vanilla custard with dry matter content equal to 25%, at a rate of about 10 grams for 90 grams of custard.

The coating product was recovered, after elimination of the custard, at the following times: day=0, day=2, day=5, day=16, day=23, and day=28 while using for each experiment the coating product coming from 30 pots, i.e. about 300 grams.

The following measurements were made on each sample of about 300 grams, kept at 4° C.:

Measurement of the pH
Measurement of the Brix (with refractometer)
Measurement of the viscosity (with "RHEOMAT 108")

The results of the measurements taken are given in the accompanying FIGS. 1 and 2 in which:

FIG. 1 shows the viscosity curves of the coating product compositions as a function of time, during their time in contact with the custard, the viscosities being read on the RHEOMAT 108 at a shearing speed of 358 seconds$^{-1}$ after 10 seconds of shearing and at 5° C.

FIG. 2 shows a part of the pH curves and the curves of evolution of the dry matter content (expressed in °Brix) as a function of time.

The results shown in FIGS. 1 and 2 are given hereafter in the following tables:

TABLE 1

| Composition of example 4 with: 0.4% Xanthan 0.2% Lambda Carrageenans | | | | | | | |
|---|---|---|---|---|---|---|---|
| | D | D + 2 | D + 5 | D + 9 | D + 16 | D + 23 | D + 28 |
| pH | 3.62 | 4.39 | 4.72 | 5.08 | 5.48 | 5.77 | 5.86 |
| Brix | 67.0 | 42.5 | 37.5 | 33.5 | 29.7 | 28.0 | 28.0 |
| Visco.* at 5° C. | 2.40 | 0.137 | 0.095 | 0.070 | 0.061 | 0.047 | 0.049 |

TABLE 1-continued

Composition of example 4 with:
0.4% Xanthan
0.2% Lambda
Carrageenans

| | D | D + 2 | D + 5 | D + 9 | D + 16 | D + 23 | D + 28 |
|---|---|---|---|---|---|---|---|
| Pa · s | | | | | | | |

*average of six measurements

TABLE II

Composition of example 5 with:
0.4% Xanthan
0.2% Iota
Carrageenans

| | D | D + 2 | D + 5 | D + 9 | D + 16 | D + 23 | D + 28 |
|---|---|---|---|---|---|---|---|
| pH | 3.60 | 4.40 | 4.62 | 5.12 | 5.38 | 5.61 | 5.74 |
| Brix | 67.0 | 42.2 | 38.7 | 33.5 | 30.7 | 29.0 | 28.0 |
| Viscos.* at 5° C. Pa · s | 3.20 | 0.143 | 0.117 | 0.081 | 0.066 | 0.057 | 0.057 |

*Average of six measurements

TABLE III

Composition of example 6 with:
0.4% Xanthan
0.2% Kappa
Carrageenans

| | D | D + 2 | D + 5 | D + 9 | D + 16 | D + 22 | D + 28 |
|---|---|---|---|---|---|---|---|
| pH | 3.62 | 4.40 | 4.78 | 5.04 | 5.64 | 5.84 | 5.87 |
| Brix | 67.7 | 42.0 | 36.5 | 34.0 | 29.5 | 28.0 | 27.5 |
| Viscos.* at 5° C. Pa · s | 4.70 | 0.170 | 0.121 | 0.102 | 0.079 | 0.072 | 0.073 |

*average of six measurements

TABLE IV

Composition of example 7 with:
0.3% Xanthan
0.1% Lambda
Carrageenans

| | D | D + 2 | D + 5 | D + 9 | D + 16 | D + 22 | D + 28 |
|---|---|---|---|---|---|---|---|
| pH | 3.60 | 4.52 | 4.80 | 5.12 | 5.47 | 5.69 | 5.88 |
| Brix | 67.5 | 40.6 | 36.0 | 33.1 | 30.5 | 29.0 | 28.0 |
| Viscos.* at 5° C. Pa · s | 2.30 | 0.084 | 0.065 | 0.051 | 0.043 | 0.041 | 0.041 |

*average of six measurements

TABLE V

Composition of example 8 with:
0.6% Xanthan
0.2% Iota
Carrageenans
0.2% Kappa
Carrageenans

| | D | D + 2 | D + 5 | D + 9 | D + 16 | D + 22 | D + 28 |
|---|---|---|---|---|---|---|---|
| pH | 3.64 | 4.23 | 4.75 | 5.03 | 5.58 | — | 5.97 |
| Brix | 67.7 | 46.8 | 37.6 | 34.5 | 30.2 | — | 28.0 |
| Viscos.* at 5° C. | 4.60 | 0.262 | 0.168 | 0.125 | 0.094 | — | 0.073 |

TABLE V-continued

Composition of example 8 with:
0.6% Xanthan
0.2% Iota
Carrageenans
0.2% Kappa
Carrageenans

| | D | D + 2 | D + 5 | D + 9 | D + 16 | D + 22 | D + 28 |
|---|---|---|---|---|---|---|---|
| Pa · s | | | | | | | |

*Average of six measurement

CONCLUSION FROM THE CURVES

—pH=f(time)—Brix=f(time): FIG. 2

The profile of the curves is similar whatever the texture agnts (or thickening composition) present in the coating product of the invention.

The evolution of the pH and Brix perameters is very considerable during the first five days then it slows down to become very slow between day=6 and D+8.

—Viscosity $\mu$=f(time): FIG. 1

The drop in viscosity is very high between day=0 (date of use) and day=2: we have shown the curve Log $\mu$=f(time) in FIG. 1.

The coating product compositions of the invention give excellent results for the water exuded by the coated product is entirely absorbed by the coating product composition which keeps the same appearance from day=5 to day=28 at least.

The palatability of the product is excellent at least until day=28 inclusive; the product keeps a good cohesion and good homogeneity at least until day=28.

COMPARATIVE EXAMPLES

Example 1A

A coating product was prepared as in example 1 while however replacing the thickening composition by 0.6% of Xanthan alone.

On day day=28, the product had a coating texture but was stringy, lacked body and the palatability was poor.

Example 1B

A coating product was prepared as in example 1 while however replacing the thickening composition by 0.6% of Lambda type carrageenans.

The coating product had a semi-gelled appearance; it was not homogeneous on day=28 (the presence of water due to synaeresis was noted.

Example 1C

A coating product was prepared as in example 1 while however replacing the thickening composition by 1.0% of guar flour.

The texture was a coating texture but the product was not homogeneous (presence of water due to synaeresis on day=28). In addition, the guar flour conferred a poor palatability on the product.

The comparative examples show that only the thickening composition of the invention allows a good coating product to be obtained, even with a high dry matter content.

Example 9

A raspberry pulp based coating product was prepared which had the following composition:

| | |
|---|---|
| Rasberry pulp (DMC 18%) | 16.55% |
| Sugars (DMC 88%) | 41.65% |
| Thickening composition | |
| Xanthan | 0.24% |
| Lambda carrageenans | 0.12% |
| Added water | 38.70% |
| Flavoring | 2.50% |
| Coloring matters | 0.24% |

The operating mode was as for example 1.

The dry matter content of the coating product composition prepared in this way was 40% on day=0.

This composition was used for coating "DANY" custards at the rate of 10 g of coating product composition for 90 g of custard.

The viscosities of the coating product composition measured with the RHEOMAT 108 after 10 seconds of shearing at 358 seconds$^{-1}$ were the following:
day=0: 0.130 PA.S
day=4: 0.078 PA.S
day=28: 0.047 PA.S As is clear from the foregoing, the invention is an no way limited to those of its embodiments and modes of application which have been described more explicitly; it embraces on the contrary all the variants which may occur to a man skilled in the matter, without departing from the scope or spirit of the present invention.

What is claimed is:

1. A coating product composition for desserts, gelled milk-based food products, custards or creams, wherein the said coating product composition has a dry matter content greater than 40% and comprises (i) a thickening composition and (ii) a coating product base wherein the said thickening composition contains carrageeenans and xanthan gum in a weight ratio of between 0.3 and 3, and wherein the said coating product base comprises fruit pulp, chocolate, coffee or mocha in the form of pieces, powder, paste, suspension or solution as well as sugar, caramel or honey, wherein the said thickening composition is present in the coating product composition in an amount of 0.4 to 1.5% by weight of the coating product composition, the xanthan present in the thickening composition representing 0.2 to 1% of the weight of the composition of coated product, wherein the said coating product composition is able to homogeneously absorb water exuded as a result of an osmotic pressure differential between the said coating product composition and a product to be coated, and wherein the said coating product composition is able to maintain its coating properties from the day it is put on sale to the latest date for consumption.

2. The coating product composition of claim 1, wherein the said thickening composition is present in the coating product composition in the amount of 0.4 to 1.2%.

3. The coating product composition of claim 1, wherein the said thickening composition is present in the coating product composition in the amount of 0.4 to 0.9% by weight.

4. The coating product composition as claimed in claim 1, wherein the proportion of carraghenanes present in the thickening composition with respect to the weight of the coating product composition is between 0.1 and 0.9% when the carrageenans used are Lambda carrageenans or a mixture of Lambda, Iota and Kappa carrageenans in which the Lambda fraction is predominant and in which the Kappa fraction is less than or equal to 0.2%.

5. The coating product composition as claimed in claim 1, wherein the proportion of carrageenans present in the thickening composition with respect to the weight of the coating product composition is between 0.05 and 0.6% when the carraghenanes used are Iota carrageenans or between 0.1 and 0.6% in the case of a mixture of Lambda, Iota and Kappa carrageenan in which the Iota fraction is predominant and the Kappa fraction is less than or equal to 0.2%.

6. The coating product composition as claimed in claim 1, wherein the proportion of carrageenans present in the thickening composition with respect to the weight of the coating product composition is between 0.05 and 0.3% in the case where the carrageenans used are Kappa carrageenans or between 0.1 and 0.45% in the case of a mixture of Lambda, Iota and Kappa carrageenans in which the Kappa fraction is predominant.

7. The coating product composition of claim 1, wherein the coating product base, expressed as dry matter content, is present in the coating product composition in a proportion between 0 and approximately 17% of the weight of said composition, the sugars or the caramel or the honey, expressed as dry matter content, are present in a proportion between about 35 and 69% of the weight of the coating product composition, this latter further containing water in a proportion between about 30 and 64% by weight.

8. The coating product composition of claim 7, wherein the dry matter content of the coating product composition is between 40 and 70% with respect to the weight of the coating product composition.

9. The coating product composition of claim 7, having a viscosity which varies as function of time gradually as water exuded from the coated product is absorbed by the said composition so that the said viscosity decreases, first rapidly, in an initial phase, by a quantity of about 4.6 PA.s, and subsequently at a much lower rate, until the ultimate date of consumption in a second phase, with the drop in viscosity being at most equal 0.24 PA.s in the second phase.

10. The coating product composition of claim 9, wherein the said drop in viscosity in the said second phase is at most equal to 0.15 PA.S.

11. The coating product composition of claim 10, wherein the said drop in viscosity in the said second phase is at most equal to 0.10 PA.S.

12. A coating product composition, comprising:
(i) a thickening composition containing a carrageenan and xanthan gum in a weight ratio of between 0.3 and 3, and (ii) a coating product base comprising (iia) a fruit pulp, chocolate, coffee or mocha, and (iib) a sugar, a caramel or a honey; wherein the said thickening composition is present in the said fruit coating composition in amount of 0.4 to 1.5% by weight, and wherein the said xanthan present in the said thickening composition represents 0.2 to 1% by weight of the said fruit coating composition, and wherein the said coating product composition is able to homogeneously absorb water exuded as a result of an osmotic pressure differential between the said coating product composition and a product to be coated, and wherein the said coating product composition is able to maintain its coating properties from the day it is put on sale to the latest date for consumption.

13. The coating product composition of claim 12, wherein the said thickening composition is present in the said food coating composition in an amount of 0.4 to 1.2% by weight.

14. The coating product composition of claim 13, wherein the said thickening composition is present in the said food coating composition in an amount of 0.4 to 0.9% by weight.

15. The coating product composition of claim 12, wherein the said carrageenan and the said xanthan gum are present in a weight ratio of 0.4 to 1.5.

16. The coating product composition of claim 12, wherein the said carrageenan comprises Lambda, Iota and Kappa-type carrageenans.

17. The coating product composition of claim 16, wherein the said Lambda, Iota and Kappa carrageenans are present in a weight ratio of about 1-2 Lambda: 1-2 Iota: 0.5-1 Kappa.

18. A food product comprising:
(i) a milk-based gelled product; and
(ii) a coating product composition made of a thickening composition containing carrageenan and xanthan gum in a weight ratio of 0.3 to 3; and a coating product base; wherein the said milk-based gelled product is coated by the said coating product composition.

19. The food product of claim 18, wherein the said weight ratio is 0.4 to 1.5.

20. The food product of claim 18, wherein the said carrageenan comprises Lambda, Iota and Kappa-type carrageenans.

21. The food product of claim 20, wherein the said Lambda, Iota and Kappa-type carrageenans are present in a weight ratio of 1-2 Lambda: 1-2 Iota: 0.5-1 Kappa.

22. The food product of claim 18, wherein the said milk-based gelled product comprises a custard or a cream.

23. The food product of claim 18 in which the milk-based gelled product is present in a proportion of 80 to 95% by weight of the food product and in which the coating compound is included in a proportion of 5 to 20% by weight.

* * * * *